(12) United States Patent
Hamilton et al.

(10) Patent No.: US 9,736,680 B2
(45) Date of Patent: Aug. 15, 2017

(54) TECHNIQUES FOR TRANSFERRING A DATA PAYLOAD UTILIZING NEAR-FIELD COMMUNICATION

(71) Applicant: Google Inc., Mountain View, CA (US)

(72) Inventors: Jeffrey William Hamilton, Austin, TX (US); Nicholas J. Pelly, San Francisco, CA (US); Benjamin J. Dodson, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 772 days.

(21) Appl. No.: 13/905,228

(22) Filed: May 30, 2013

(65) Prior Publication Data

US 2014/0006510 A1   Jan. 2, 2014

Related U.S. Application Data

(60) Provisional application No. 61/665,018, filed on Jun. 27, 2012.

(51) Int. Cl.
*H04W 8/24* (2009.01)
*H04M 1/725* (2006.01)
(Continued)

(52) U.S. Cl.
CPC .............. *H04W 8/24* (2013.01); *H04L 69/18* (2013.01); *H04M 1/7253* (2013.01);
(Continued)

(58) Field of Classification Search
CPC ...... H04L 69/18; H04L 69/24; H04M 1/7253; H04W 48/18; H04W 76/02; H04W 76/023; H04W 84/18; H04W 88/06; H04W 8/24

See application file for complete search history.

(56) References Cited

U.S. PATENT DOCUMENTS 6,741,836 B2 * 5/2004 Lee ................. G06F 1/3203
                                                375/E1.002
7,730,482 B2 * 6/2010 Illowsky ............ G06F 1/3203
                                                709/202
(Continued)

FOREIGN PATENT DOCUMENTS

EP    1633104 A    3/2006
EP    2012480 A    1/2009
(Continued)

OTHER PUBLICATIONS http://www.calctool.org/CALC/prof/computing/transfer_time; 2008.*

(Continued)

*Primary Examiner* — Krista Zele
*Assistant Examiner* — Brandon L Sykes
(74) *Attorney, Agent, or Firm* — Remarck Law Group PLC (57) ABSTRACT

A method can include receiving, at a first computing device having one or more processors, a command to transfer a data payload to a second computing device and information from the second computing device using a near-field communication (NFC) protocol. The information can be indicative of a plurality of communication protocols capable of being received at the second computing device, including the NFC communication protocol. Additionally, the method can include estimating a transfer time corresponding to each of the plurality of communication protocols. Each of the transfer times can be indicative of an amount of time to transfer the data payload between the first and second computing devices using its corresponding communication protocol. The method can also include selecting a specific communication protocol based on the estimated transfer times and (Continued)

transmitting the data payload using the specific communication protocol.

19 Claims, 3 Drawing Sheets

(51) Int. Cl.
    *H04L 29/06*     (2006.01)
    *H04W 76/02*     (2009.01)
    *H04W 48/18*     (2009.01)
    *H04W 88/06*     (2009.01)
    *H04W 84/18*     (2009.01)

(52) U.S. Cl.
    CPC .......... *H04W 48/18* (2013.01); *H04W 76/02* (2013.01); *H04L 69/24* (2013.01); *H04W 76/023* (2013.01); *H04W 84/18* (2013.01); *H04W 88/06* (2013.01)

(56) References Cited

U.S. PATENT DOCUMENTS

| | | | |
|---|---|---|---|
| 7,762,470 B2* | 7/2010 | Finn | G06K 7/0004 235/380 |
| 7,821,399 B2 | 10/2010 | Otranen | |
| 8,666,313 B2* | 3/2014 | Preston et al. | 455/41.1 |
| 8,706,037 B1* | 4/2014 | Hamilton et al. | 455/41.2 |
| 2005/0111420 A1* | 5/2005 | Fujii | 370/338 |
| 2007/0116431 A1* | 5/2007 | Ito | G11B 20/1217 386/248 |
| 2007/0264976 A1 | 11/2007 | Lessing et al. | |
| 2007/0297356 A1 | 12/2007 | Rofougaran | |
| 2008/0046570 A1 | 2/2008 | Abel | |
| 2008/0194266 A1* | 8/2008 | Islam | H04W 28/18 455/450 |
| 2009/0116431 A1* | 5/2009 | Cadieux | H04W 48/18 370/329 |
| 2010/0017486 A1* | 1/2010 | Yokoyama | H04L 69/26 709/206 |
| 2010/0082567 A1 | 4/2010 | Rosenblatt et al. | |
| 2011/0009075 A1 | 1/2011 | Jantunen et al. | |
| 2011/0047237 A1* | 2/2011 | Walsh | G06Q 10/10 709/207 |
| 2011/0076941 A1 | 3/2011 | Taveau et al. | |
| 2011/0244793 A1 | 10/2011 | Nagao | |
| 2012/0077433 A1* | 3/2012 | Walker | H04M 1/7253 455/41.1 |
| 2012/0317194 A1* | 12/2012 | Tian | H04W 8/005 709/204 |
| 2013/0143487 A1* | 6/2013 | Hillan | 455/41.1 |
| 2013/0166399 A1* | 6/2013 | Awad | G06Q 30/0207 705/16 |
| 2013/0189924 A1* | 7/2013 | Pedro | H04W 4/008 455/41.1 |
| 2014/0162553 A1* | 6/2014 | Huomo | 455/41.1 |
| 2014/0362713 A1* | 12/2014 | Agarwal | H04W 24/08 370/252 |
| 2015/0038081 A1* | 2/2015 | Bandyopadhyay et al. | 455/41.1 |

FOREIGN PATENT DOCUMENTS

EP           2434721 A     3/2012
WO     2010089458 A     8/2010

OTHER PUBLICATIONS

Andy Shipway, 2008, Data Transfer Time, http://www.calctool.org/CALC/prof/computing/transfer_time.*
PCT International Search Report and Written Opinion dated Oct. 31, 2013 for PCT International Application No. PCT/US2013/047524, 8 pages.

* cited by examiner

TECHNIQUES FOR TRANSFERRING A DATA PAYLOAD UTILIZING NEAR-FIELD COMMUNICATION

CROSS-REFERENCE TO RELATED APPLICATIONS

This application claims the benefit of U.S. Provisional Application No. 61/665,018, filed on Jun. 27, 2012. The entire disclosure of the above application is incorporated herein by reference.

FIELD

The present disclosure relates to techniques for transferring data between computing devices utilizing Near-Field Communication ("NFC").

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices (mobile phones, tablet computers, laptop computers, etc.) can be configured to communicate via NFC. For example, a computing device can receive data from and transfer data to an active device (computers, mobile phones, etc.) or a passive device (NFC tags, key fobs, etc.). NFC data transfer rates may be slower than other communication protocols, such as Bluetooth and wireless communication protocols. For example, NFC data transfer rates may be limited to 424 kilobits per second (kbits/sec) while Bluetooth data transfer rates may exceed 2 megabits per second (Mbits). Conversely, the amount of time to establish a Bluetooth communication session with another device can be much greater than the amount of time to establish an NFC session.

SUMMARY

According to some embodiments of the present disclosure, a computer-implemented method is disclosed. The method can include receiving, at a first computing device having one or more processors, a command to transfer a data payload to a second computing device. The method can further include receiving, at the first computing device, information from the second computing device using a near-field communication (NFC) protocol. The information can be indicative of a plurality of communication protocols capable of being received at the second computing device, including the NFC communication protocol. Additionally, the method can include estimating, at the first computing device, a transfer time corresponding to each of the plurality of communication protocols. Each of the transfer times can be indicative of an amount of time to transfer the data payload from the first computing device to the second computing device using its corresponding communication protocol. The method can also include selecting, at the first computing device, a specific communication protocol of the plurality of communication protocols based on the estimated transfer times and transmitting the data payload to the second computing device, from the first computing device, using the specific communication protocol.

In some embodiments, the method can include obtaining, at the first computing device, a data transfer rate corresponding to each of the plurality of communication protocols. Each of the data transfer rates can be indicative of an expected rate of data transfer for its corresponding communication protocol. Further, the method can include obtaining, at the first computing device, a setup time corresponding to each of the plurality of communication protocols. Each of the setup times can be indicative of an amount of time to establish communication between the first and the second computing devices for its corresponding communication protocol. The transfer time for each particular communication protocol can be based on the data transfer rate and setup time for the particular communication protocol.

Furthermore, the method can include obtaining, at the first computing device, a size of the data payload in some embodiments. Accordingly, each estimated transfer time can be further based on the size of the data payload. The plurality of communication protocols can further include a Bluetooth communication protocol, a wireless communication protocol, and a Wi-Fi direct communication protocol.

According to various embodiments of the present disclosure, the method can further include determining, at the first computing device, an ON/OFF state of a communication module at the first computing device corresponding to each particular communication protocol of the plurality of communication protocols. The information received from the second computing device can further include an ON/OFF state of a communication module at the second computing device corresponding to each particular communication protocol of the plurality of communication protocols. In these embodiments, the setup time for each particular communication protocol can be based on the ON/OFF state of the communication module at the first computing device and the ON/OFF state of the communication module at the second computing device corresponding to the particular communication protocol.

Additionally or alternatively, the method can include determining, at the first computing device, a pairing time corresponding to each particular communication protocol of the plurality of communication protocols. Each pairing time can be indicative of an amount of time to pair the first computing device with the second computing device when the ON/OFF states of the communication modules at the first and second computing devices are both ON. In these embodiments, the setup time for each particular communication protocol can be further based on the pairing time corresponding to the particular communication protocol.

In some embodiments, the method can further include determining, at the first computing device, a power ON time corresponding to each particular communication protocol of the plurality of communication protocols. The power ON time can be indicative of one of: (i) zero when the communication modules at the first and second computing devices for the particular communication protocol are both ON, (ii) an amount of time to change the ON/OFF state of the communication module at the first computing device for the particular communication protocol to ON when the communication module at the first computing device for the particular communication protocol is OFF and the communication module at the second computing device for the particular communication protocol is ON, (iii) an amount of time to change the ON/OFF state of the communication module at the second computing device for the particular communication protocol to ON when the communication module at the second computing device for the particular communication protocol is OFF and the communication module at the first computing device for the particular communication protocol is ON, and (iv) a maximum of: (a) the amount of time to change the ON/OFF state of the communication module at the first computing device for the particular communication protocol to ON and (b) the amount of time to change the ON/OFF state of the communication module for the particular communication protocol at the second computing device to ON when the communication modules at the first and second computing devices for the particular communication protocol are both OFF. In these embodiments, the setup time for each particular communication protocol can be further based on the power ON time corresponding to the particular communication protocol.

In some embodiments, the setup time for each particular communication protocol of the plurality of communication protocols can be further based on a sum of the pairing time and the power ON time for the particular communication protocol. Additionally, the method can further include obtaining, at the first computing device, a size of the data payload, wherein each estimated transfer time is further based on the size of the data payload. The transfer time corresponding to each particular communication protocol can be based on:

$$T_P = \frac{\text{Size}}{R_P} + S_P$$

where $T_P$ is the transfer time corresponding to the particular communication protocol P, Size is the size of the data payload, $R_P$ is the data transfer rate corresponding to the particular communication protocol P, and $S_P$ is the setup time corresponding to the particular communication protocol P.

Additionally, the setup time corresponding to each particular communication protocol can be based on:

$$S_P = L_P + \max |PS_{P(1)}, PS_{P(2)}|$$

where $L_P$ is the pairing time corresponding to the particular communication protocol P, $PS_{P(1)}$ is the power ON time for the communication module of the first computing device corresponding to communication protocol P, and $PS_{P(2)}$ is the power ON time for the communication module of the second computing device corresponding to communication protocol P. Further, the method can further include establishing, at the first computing device, NFC with the second computing device. The information can be provided to the first computing device by the second computing device during the establishing of NFC.

According to various embodiments of the present disclosure, a computer system is disclosed. The computer system can include a non-transitory computer-readable storage medium and at least one processor. The non-transitory computer-readable storage medium can include executable computer program code for performing the computer-implemented method described above, and the at least one processor can be configured to execute the executable computer program code.

In some embodiments, the first computing device having a processing device configured to perform operations is disclosed. The operations can include the steps of the computer-implemented method described above. In other embodiments, a non-transitory computer-readable storage medium storing executable computer program instructions is disclosed. The computer program instructions can include instructions for performing the steps of the computer-implemented method described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, near-field communication ("NFC") data transfer rates can be lower than data transfer rates associated with other communication protocols, e.g., Bluetooth or Wi-Fi Direct. Conversely, the amount of time required to establish an NFC session may be relatively small when compared to other communication protocols. In order to provide for faster data transmission, a computing device may determine to transfer a data payload, which was originally intended to be transferred via NFC, by utilizing another communication protocol.

Figure 1:
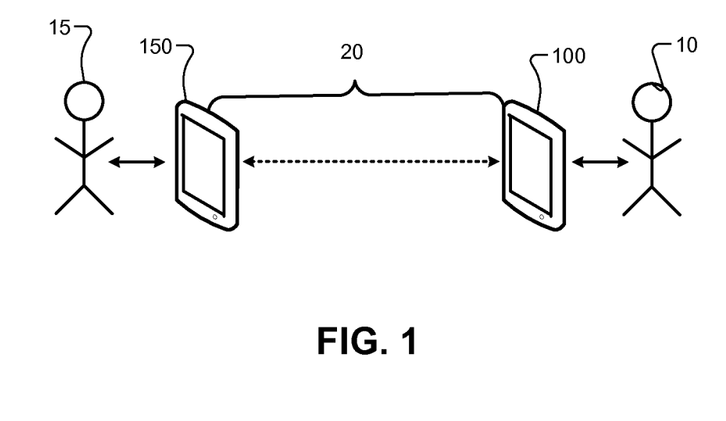
FIG. 1 is a schematic diagram illustrating transmission of a data payload between two computing devices utilizing NFC in accordance with some embodiments of the present disclosure.

Referring now to FIG. 1, a schematic diagram illustrating transmission of a data payload between two computing devices utilizing NFC in accordance with some embodiments of the present disclosure is depicted. In the illustrated example, the first computing device 100 is associated with a first user 10 and the second computing device 150 is associated with a second user 15. While the first and second computing devices 100, 150 are depicted as mobile computing devices in FIG. 1, it should be appreciated that these devices can be any suitable computing device, such as a mobile telephone, a tablet computing device, a personal digital assistant (PDA), a laptop computing device, a desktop computing device, a medical device, and a portable gaming device.

To establish an NFC session between the first computing device 100 and the second computing device 150, the first user 10 can move the first computing device 100 within the effective communication range 20 for NFC (approximately four centimeters or less) of the second computing device 150. Upon entering the range 20, the first user 10 can request to transfer a data packet via NFC by providing a command to the first computing device 100, for example by tapping the first computing device 100 to the second mobile device 150. Additionally or alternatively, the command may be provided to the first computing device 100 by an application executing on the first computing device 100, the second computing device 150, or a combination thereof. Upon receiving the command, the first computing device 100 can initiate a pairing procedure in accordance with the NFC protocol. Upon completion of the pairing procedure, the first computing device 100 and the second computing device 150 can exchange information via NFC.

Once an NFC session is established between the first and the second computing devices 100, 150, the first computing device 100 can receive information from the second computing device 150 regarding its capabilities. The information received from the second computing device 150 can, for example, be indicative of a plurality of communication protocols capable of being received by the second computing device 150. Based on this information, the first computing device 100 can determine whether to transmit the data payload using the NFC protocol or another communication protocol, e.g., Bluetooth communication protocol, wireless communication protocol (IEEE 802.11), and Wi-Fi direct communication protocol. In order to provide for faster transmission of the data payload, the first computing device 100 can select the specific communication protocol to utilize based on an estimated transfer time for each of the available communication protocols.

The first computing device 100 can estimate a transfer time corresponding to each of the plurality of communication protocols that the second computing device 150 can receive. Each transfer time can be indicative of the amount of time to transfer the data payload from the first computing device 100 to the second computing device 150 using its corresponding communication protocol, as described more fully below. The first computing device 100 can select a specific communication protocol of the plurality of communication protocols based on the estimated transfer times, as described more fully below. Upon selection of the appropriate communication protocol, the first computing device 100 can transmit the data payload to the second computing device 150 using the selected communication protocol.

In some embodiments, the first computing device 100 can also obtain a data transfer rate corresponding to each of the plurality of communication protocols. Each data transfer rate can be indicative of the expected rate of data transfer (e.g., in megabytes per second or similar measure) for its corresponding communication protocol. In these embodiments, the transfer time for each particular communication protocol can be based on the data transfer rate for the particular communication protocol.

The first computing device 100 can also or alternatively obtain a setup time corresponding to each of the plurality of communication protocols. Each setup time can be indicative of the amount of time to establish a communication session between the first and second computing devices 100, 150 for its corresponding communication protocol. As described more fully below, the setup time for each particular communication protocol can be based on the pairing time and/or the power ON time for the particular communication protocol. For example only, the setup time for each particular communication protocol may be approximately equal to the sum of the pairing time and the power ON time for the particular communication protocol.

Further, the setup time can be based on the ON/OFF state of the communication modules at the first and second computing devices 100, 150. Each communication protocol may have a corresponding communication module (NFC module, Bluetooth module, etc.) at the first and second computing devices 100, 150. If at least one of the communication modules at the first and second computing devices 100, 150 is OFF, the setup time may be increased relative to the setup time when both communication modules are ON. For example only, the setup time may be increased to include the amount of time required to turn ON the communication module.

The first computing device 100 can determine a power ON time corresponding to each particular communication protocol of the plurality of communication protocols. In some embodiments, the first computing device 100 can determine the ON/OFF state of a communication module at the first computing device 100 corresponding to each particular communication protocol. Additionally, the information received from the second computing device 150 regarding its capabilities may further include an ON/OFF state of a communication module at the second computing device 150 corresponding to each particular communication protocol.

If both communication modules at the first and second computing devices 100, 150 are ON, the power ON time can be zero. If either of the communication modules at the first and second computing devices 100, 150 is OFF, the power ON time can be equal to the amount of time to change the ON/OFF state of the OFF communication module to ON. If both communication modules at the first and second computing devices 100, 150 are OFF, the power ON time can be equal to the maximum of (1) the amount of time to change the ON/OFF state of the communication module at the first computing device 100 to ON, and (2) the amount of time to change the ON/OFF state of the communication module at the second computing device 150 to ON. Therefore, the power ON time can be indicative of one of:
(i) zero when the communication modules at the first and second computing devices 100, 150 are both ON;
(ii) an amount of time to change the ON/OFF state of the communication module at the first computing device 100 for the particular communication protocol to ON when the communication module at the first computing device 100 for the particular communication protocol is OFF and the communication module at the second computing device 150 for the particular communication protocol is ON;
(iii) an amount of time to change the ON/OFF state of the communication module at the second computing device 150 for the particular communication protocol to ON when the communication module at the second computing device 150 for the particular communication protocol is OFF and the communication module at the first computing device 100 for the particular communication protocol is ON; and
(iv) a maximum of: (a) the amount of time to change the ON/OFF state of the communication module at the first computing device 100 for the particular communication protocol to ON and (b) the amount of time to change the ON/OFF state of the communication module for the particular communication protocol at the second computing device 150 to ON when the communication modules at the first and second computing devices 100, 150 for the particular communication protocol are both OFF.

The first computing device 100 can determine a pairing time corresponding to each particular communication protocol of the plurality of communication protocols. Each pairing time can be indicative of an amount of time to pair the first and second computing devices 100, 150 when the ON/OFF states of the communication modules at the first and second computing devices 100, 150 are both ON. The pairing time for each communication protocol can differ greatly. Additionally or alternatively, the first computing device 100 can obtain the size of the data payload, upon which each estimated transfer time can be based.

Figure 2:
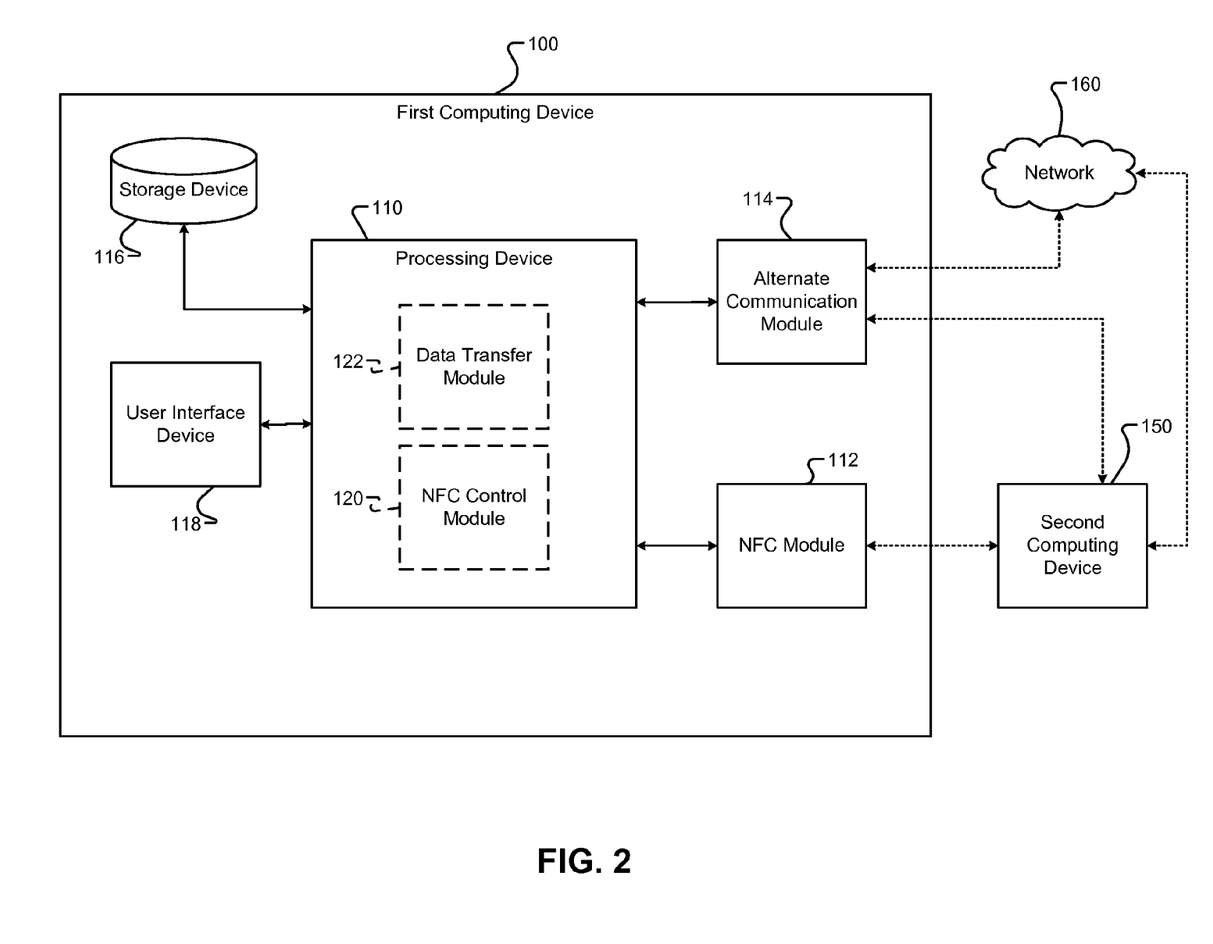
FIG. 2 is a block diagram illustrating example components of one of the computing devices of FIG. 1.

Referring now to FIG. 2, a block diagram illustrating example components of one of the first computing device 100 is illustrated. The first computing device 100 can include a processing device 110, an NFC module 112, an alternate communication module 114, a storage device 116, and an input/output device 118.

The processing device 110 can control operation of the first computing device 100 and can include a memory (e.g., random access memory and/or read-only memory) and one or more processors. The memory can store processor-executable instructions that may be executed by the one or more processors. In embodiments where the processing device 110 includes two or more processors, the two or more processors can operation in a parallel or distributed manner. The processing device 110 can also execute functions including, but not limited to, controlling communication between the first computing device 100 and the second computing device 150. The processing device 110 can also wholly or partially execute the NFC control module 120 and the data transfer module 122.

The NFC module 112 can enable communication with the second computing device 150 via the NFC protocol. The NFC module 112 can include one or more antennas that are configured to perform NFC transmission. The NFC module 112 can receive and transmit NFC data packets, such as those including the information described above and/or the data payload.

The alternate communication module 114 can include one or more antennas or communication ports for communicating with a network 160 and/or the second computing device 150 in accordance with a communication protocol other than the NFC protocol. The alternate communication module 114 can be configured to perform communication over a wireless connection or a wired connection. For example, the alternate communication module 114 can be configured to communicate with the network 160 using a cellular telecommunications protocol, a wireless communication protocol, or an Ethernet communication protocol. Similarly, the alternate communication module 114 can be configured to communicate with the second computing device 150 directly using a Bluetooth communication protocol, a Wi-Fi direct communication protocol, a USB communication protocol, or a firewire communication protocol. The foregoing list of communication protocols are provided for example only and not intended to be limiting. It should be appreciated that while one alternate communication module 114 is shown, the term alternate communication module 114 includes multiple alternate communication modules 114, each implementing a different communication protocol. It is further noted that an alternate communication module 114 can implement more than one communication protocol. For instance, if the alternate communication module 114 includes a wireless transceiver, the alternate communication module 114 may implement both the wireless communication protocol and the Wi-Fi direct communication protocol.

The storage device 116 can include one or more non-transitory storage mediums, including but not limited to hard disk drives, optical disk drives, and flash memory drives. The storage device 116 can store data files. Examples of the types of data files that are stored in the storage device 116 can include, but are not limited to, uniform resource locators (URLs), electronic business cards or contacts, digital photographs, text documents, audio files, video files, and software applications. When a user 10, 15 or application requests that a data payload be transmitted to the second computing device 150, the processing device 110 can obtain the data payload from the storage device 116.

The user interface device 118 enables a user to interact with the first computing device 100. The user interface device 118 enables input to and/or output from the first computing device 100. It should be appreciated that while one user interface device 118 is shown, the term user interface device also includes a plurality of user interface devices. Examples of a user interface device include, but are not limited to, a touchscreen display, a physical-QWERTY keyboard, a speaker, and a microphone.

The NFC control module 120 is configured to establish NFC with the second computing device 150, receive a command to transmit a data payload to the second computing device 150, and to determine whether to provide the data payload using the NFC protocol or another communication protocol. The NFC control module 120 can be configured to control the NFC module 112 and can transmit NFC data packets to the second computing device 150 using the NFC module 112.

Upon receiving a command to establish NFC with the second computing device 150, the NFC control module 120 can command the NFC module 112 to begin the pairing procedure. Once paired, the second computing device 150 can transmit information regarding its capabilities to the first computing device 100. As mentioned above, the information can include information indicative of a plurality of communication protocols capable of being received by the second computing device 150. Furthermore, in some embodiments, the information can further include an identifier of the manufacturer and/or model of the second computing device 150 or specific components thereof (antenna, software version, chipset, etc.), as well as other identifying or performance information (which communication modules are ON, which communication modules are OFF, etc.). The information may also include parameters for establishing communication using the different communication protocols. For example, the information may include a Bluetooth address and a service UUID of the second computing device 150 for the Bluetooth communication protocol, as well as similar information for additional communication protocols.

The NFC control module 120 can further estimate the transfer time corresponding to each of the plurality of communication protocols. As described above, the transfer time for each communication protocol can be based on the data transfer rate, the setup time and/or the size of the data payload. In some embodiments, the NFC control module 120 can estimate the transfer time of each particular communication protocol based on the following equation:

$$T_P = \frac{\text{Size}}{R_P} + S_P, \quad \text{Eq. (1)}$$

where $T_P$ is the transfer time for the communication protocol P, Size is the size of the data payload, $R_P$ is the data transfer rate corresponding to the communication protocol P, and $S_P$ is the setup time corresponding to the communication protocol P. The size of the data payload can, e.g., be determined from the metadata of the payload. Values for $R_P$ can be stored at the first computing device 100, e.g., in a lookup table stored at the storage device 116. It is noted that the lookup table can store data transfer rates for different communication protocols. Furthermore, multiple data transfer rates corresponding to a particular communication protocol can be stored in the lookup table, where each of the multiple data transfer rates can correspond to a different device manufacturer, chipset manufacturer, antenna version, software version, etc. Thus, the manufacturer of the second computing device 150 and/or the first computing device 100 may also be used to determine the data transfer rate from the lookup table.

The NFC control module 120 can further determine the setup time for each of the communication protocols based on the following equation:

$$S_P = L_P + \max|PS_{P(1)}, PS_{P(2)}|  \quad \text{Eq. (2)}$$

where $L_P$ is the pairing time corresponding to communication protocol P, $PS_{P(1)}$ is the power ON time for the communication module of the first computing device 100 corresponding to communication protocol P, and $PS_{P(2)}$ is the power ON time for the communication module of the second computing device 150 corresponding to communication protocol P. The values for $PS_{P(1)}$, $PS_{P(2)}$ and $L_P$ can be stored at the first computing device 100, e.g., in a lookup table stored at the storage device 116. It is noted that the lookup table can store these values for different communication protocols, and that multiple values corresponding to a particular communication protocol can be stored in the lookup table, each value corresponding to a different device manufacturer, chipset manufacturer, antenna version, software version, etc. Thus, the manufacturer of the second computing device 150 and/or the first computing device 100 may also be used to determine the values for values for $PS_{P(1)}$, $PS_{P(2)}$ and $L_P$. It should be appreciated that the setup time for the NFC protocol will be approximately equal to zero as the first and second computing devices 100, 150 will already be paired for NFC transfers.

The values in the lookup tables, e.g., data transfer rates, pairing times, and power ON times, can be determined by various known techniques, including heuristic and/or crowd-sourcing techniques. An example lookup table is provided below. The table is not intended to be limiting and the values provided therein are provided for example only:

|  | NFC | Bluetooth | Wi-Fi Direct |
| --- | --- | --- | --- |
| Data Transfer Rate | 424 kbits/sec | 2.1 Mbits/sec | 11 Mbits/sec |
| Pairing Time | 0 seconds | 15 seconds | 45 seconds |
| Power ON Time for Communication Module at the First Computing Device | 0 seconds | 5 seconds | 10 seconds |
| Power ON Time for Communication Module at the Second Computing Device | 0 Seconds | 3 seconds | 8 seconds |

Once the NFC control module 120 has estimated the transfer times for each of the communication protocols, the NFC control module 120 can select the communication protocol having the lowest estimated transfer time. It is noted that the NFC control module 120 can also select the communication protocol based on other factors, such as monetary costs, qualities of service (QoS), and security concerns corresponding to the communication protocols. If the selected communication protocol is the NFC protocol, the NFC control module 120 can transmit the data payload using the NFC module 112. If the selected communication protocol is not the NFC protocol, the NFC control module 120 can perform a connection handover to the data transfer module 122. Any techniques for performing a connection handover from the NFC protocol to another communication protocol can be utilized.

The data transfer module 122 can transmit the data payload according to the selected communication protocol via the alternate communication module 114. The data transfer module 114 can obtain the data payload from the NFC module 112 or from the storage device 116. The data payload can be packetized according to the selected communication protocol, and then transmitted to the second computing device 150 via the alternate communication module 114 in accordance with the selected communication protocol.

Figure 3:
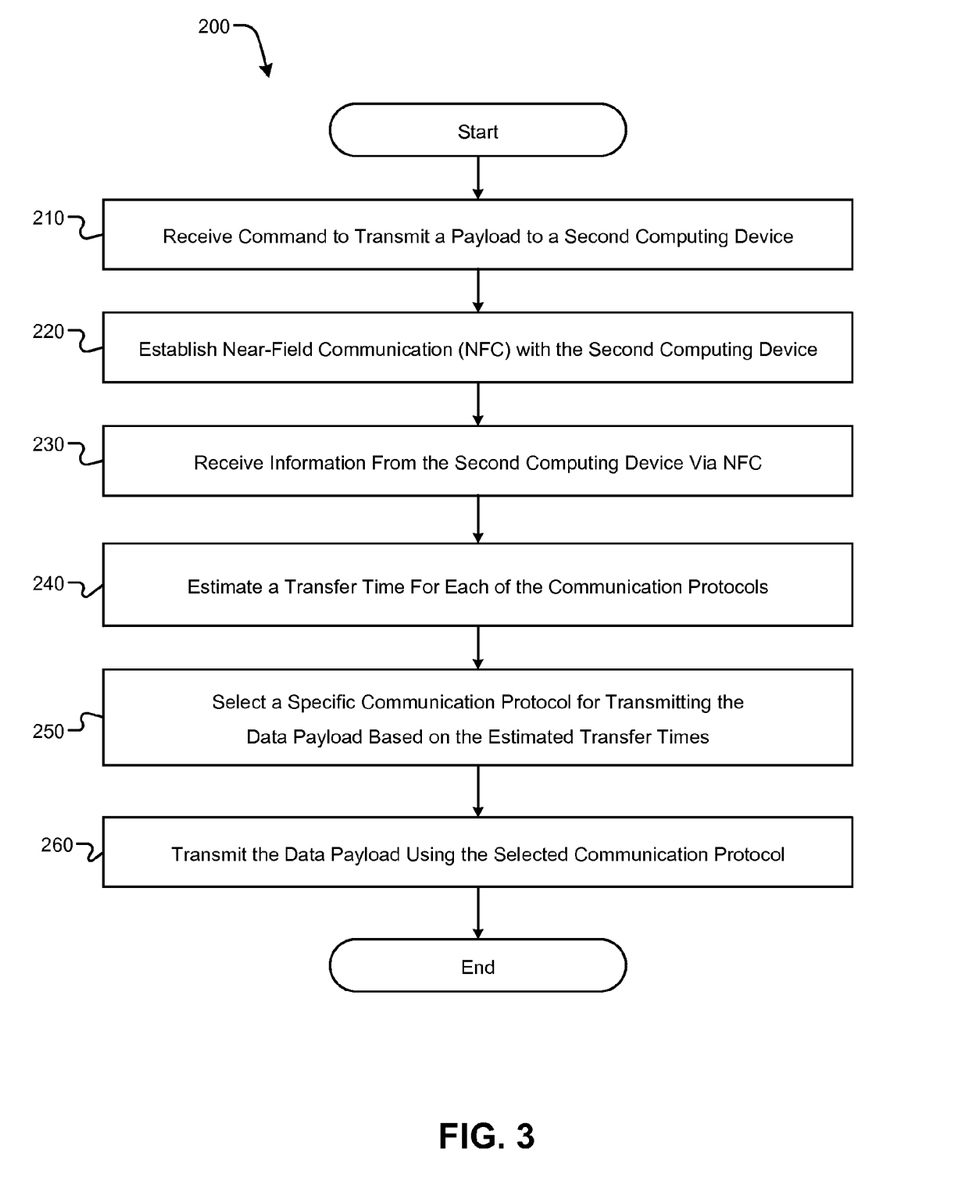
FIG. 3 is a flow chart illustrating an example technique for transmitting a data payload from a first computing device to a second computing device utilizing NFC in accordance with some embodiments of the present disclosure.

Referring now to FIG. 3, a flow chart illustrating an example technique 200 for transmitting a data payload from a first computing device 100 to a second computing device 150 is illustrated. At 220, the first computing device 100 can receive a command to transmit a data payload to the second computing device 150. At 220, the first computing device 100 can establish NFC with the second computing device 150. At 230, the first computing device 100 can receive information from the second computing device. As described above, the information can include information regarding the capabilities of the second computing device 150, such as information indicative of a plurality of communication protocols capable of being received by the second computing device 150, an identifier of the manufacturer and/or model of the second computing device 150 or specific components thereof (antenna, software version, chipset, etc.), as well as other identifying or performance information (which communication modules are ON, which communication modules are OFF, etc.).

The first computing device 100 can estimate a transfer time for each of the communication protocols at 240. As described above, for each particular communication protocol, the first computing device 100 can estimate the transfer time based on one or more of the following: the size of the data payload, the data transfer rate, and a setup time corresponding to the particular communication protocol. At 250, the first computing device 100 can select a specific communication protocol for transmitting the data payload based on the estimated transfer times. In some embodiments, the first computing device 100 selects the communication protocol having the least estimated transfer time. In other embodiments, other factors may be considered by the first computing device 100, for example, a monetary cost associated with using an alternate protocol. At 260, the first computing device 100 transmits the data payload to the second computing device 150 using the selected communication protocol.

The technique 200 described herein are provided for example only. It is further noted that the foregoing technique 200 may be performed wholly or in part by the second computing device 150. Furthermore, the technique 200 may be modified to include embodiments where the first mobile computing device 100 initiates and establishes the NFC session and issues a command for a data payload to the second mobile computing device 150.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a first computing device having one or more processors, a command to transfer a data payload to a second computing device;
receiving, at the first computing device, information from the second computing device using a near-field communication (NFC) communication protocol, the information being indicative of a plurality of communication protocols capable of being utilized by the second computing device, the plurality of communication protocols each being a short-range wireless communication protocol and including the NFC communication protocol;
for each of the plurality of communication protocols, obtaining, at the first computing device:
(i) a data transfer rate indicative of an expected rate of data transfer for a particular communication protocol, and
(ii) a setup time indicative of an amount of time to establish communication between the first and the second computing devices via the particular communication protocol, wherein the setup time is based on (a) a power ON time for communication modules corresponding to the particular communication protocol to become powered ON at both the first and second computing devices and (b) a pairing time indicative of an amount of time to pair the first and second computing devices;
estimating, at the first computing device, a transfer time corresponding to each of the plurality of communication protocols based on their corresponding data transfer rates and setup times, each transfer time being indicative of an amount of time to transfer the data payload from the first computing device to the second computing device using its corresponding communication protocol;
selecting, at the first computing device, a specific communication protocol of the plurality of communication protocols based on the estimated transfer times; and
transmitting, from the first computing device, the data payload to the second computing device using the specific communication protocol.

2. The method of claim 1, further comprising obtaining, at the first computing device, a size of the data payload, wherein each estimated transfer time is further based on the size of the data payload.

3. The method of claim 1, further comprising determining, at the first computing device, an ON/OFF state of a communication module at the first computing device corresponding to each particular communication protocol of the plurality of communication protocols,
wherein (i) the information includes an ON/OFF state of a communication module at the second computing device corresponding to each particular communication protocol of the plurality of communication protocols, and (ii) the setup time for each particular communication protocol is based on the ON/OFF state of the communication module at the first computing device and the ON/OFF state of the communication module at the second computing device corresponding to the particular communication protocol.

4. The method of claim 3, further comprising:
determining, at the first computing device, the pairing time corresponding to each particular communication protocol of the plurality of communication protocols, each pairing time being indicative of the amount of time to pair the first computing device with the second computing device when the ON/OFF states of the communication modules at the first and second computing devices are both ON.

5. The method of claim 4, further comprising:
determining, at the first computing device, the power ON time corresponding to each particular communication protocol of the plurality of communication protocols, the power ON time being indicative of one of:
(i) zero when the communication modules at the first and second computing devices for the particular communication protocol are both ON,
(ii) an amount of time to change the ON/OFF state of the communication module at the first computing device for the particular communication protocol to ON when the communication module at the first computing device for the particular communication protocol is OFF and the communication module at the second computing device for the particular communication protocol is ON,
(iii) an amount of time to change the ON/OFF state of the communication module at the second computing device for the particular communication protocol to ON when the communication module at the second computing device for the particular communication protocol is OFF and the communication module at the first computing device for the particular communication protocol is ON, and
(iv) a maximum of: (a) the amount of time to change the ON/OFF state of the communication module at the first computing device for the particular communication protocol to ON and (b) the amount of time to change the ON/OFF state of the communication module for the particular communication protocol at the second computing device to ON when the communication modules at the first and second computing devices for the particular communication protocol are both OFF.

6. The method of claim 1, further comprising obtaining, at the first computing device, a size of the data payload, wherein each estimated transfer time is further based on the size of the data payload.

7. The method of claim 6, wherein the transfer time corresponding to each particular communication protocol is based on:

$$T_P = \frac{\text{Size}}{R_P} + S_P$$

where $T_P$ is the transfer time corresponding to the particular communication protocol P, Size is the size of the data payload, $R_P$ is the data transfer rate corresponding to the particular communication protocol P, and $S_P$ is the setup time corresponding to the particular communication protocol P.

8. The method of claim 7, wherein the setup time corresponding to each particular communication protocol is based on:

$$S_P = L_P + \max|PS_{P(1)}, PS_{P(2)}|$$

where $L_P$ is the pairing time corresponding to the particular communication protocol P, $PS_{P(1)}$ is the power ON time for the communication module of the first computing device corresponding to communication protocol P, and $PS_{P(2)}$ is the power ON time for the communication module of the second computing device corresponding to communication protocol P.

9. The method of claim 1, further comprising:
establishing, at the first computing device, NFC with the second computing device, wherein the information is provided to the first computing device by the second computing device during the establishing.

10. A first computing device, comprising:
a non-transitory, computer-readable medium having a set of instructions stored thereon; and
one or more processors configured to execute the set of instructions, which causes the first computing device to perform operations comprising:
receiving a command to transfer a data payload to a second computing device;
receiving information from the second computing device using a near-field communication (NFC) communication protocol, the information being indicative of a plurality of communication protocols capable of being utilized by the second computing device, the plurality of communication protocols each being a short-range wireless communication protocol and including the NFC communication protocol;
for each of the plurality of communication protocols, obtaining:
(i) a data transfer rate indicative of an expected rate of data transfer for a particular communication protocol, and
(ii) a setup time indicative of an amount of time to establish communication between the first and the second computing devices via the particular communication protocol, wherein the setup time is based on (a) a power ON time for communication modules corresponding to the particular communication protocol to become powered ON at both the first and second computing devices and (b) a pairing time indicative of an amount of time to pair the first and second computing devices;
estimating a transfer time corresponding to each of the plurality of communication protocols based on their corresponding data transfer times and setup times, each transfer time being indicative of an amount of time to transfer the data payload from the first computing device to the second computing device using its corresponding communication protocol;
selecting a specific communication protocol of the plurality of communication protocols based on the estimated transfer times; and
transmitting the data payload to the second computing device using the specific communication protocol.

11. The first computing device of claim 10, wherein the operations further comprise determining an ON/OFF state of a communication module at the first computing device corresponding to each particular communication protocol of the plurality of communication protocols,
wherein (i) the information includes an ON/OFF state of a communication module at the second computing device corresponding to each particular communication protocol of the plurality of communication protocols, and (ii) the setup time for each particular communication protocol is based on the ON/OFF state of the communication module at the first computing device and the ON/OFF state of the communication module at the second computing device corresponding to the particular communication protocol.

12. The first computing device of claim 11, wherein the operations further comprise:
determining the pairing time corresponding to each particular communication protocol of the plurality of communication protocols, each pairing time being indicative of the amount of time to pair the first computing device with the second computing device when the ON/OFF states of the communication modules at the first and second computing devices are both ON.

13. The first computing device of claim 12, wherein the operations further comprise:
determining the power ON time corresponding to each particular communication protocol of the plurality of communication protocols, the power ON time being indicative of one of:
(i) zero when the communication modules at the first and second computing devices for the particular communication protocol are both ON,
(ii) an amount of time to change the ON/OFF state of the communication module at the first computing device for the particular communication protocol to ON when the communication module at the first computing device for the particular communication protocol is OFF and the communication module at the second computing device for the particular communication protocol is ON,
(iii) an amount of time to change the ON/OFF state of the communication module at the second computing device for the particular communication protocol to ON when the communication module at the second computing device for the particular communication protocol is OFF and the communication module at the first computing device for the particular communication protocol is ON, and
(iv) a maximum of: (a) the amount of time to change the ON/OFF state of the communication module at the first computing device for the particular communication protocol to ON and (b) the amount of time to change the ON/OFF state of the communication module for the particular communication protocol at the second computing device to ON when the communication modules at the first and second computing devices for the particular communication protocol are both OFF.

14. The first computing device of claim 10, wherein the operations further comprise obtaining a size of the data payload, wherein each estimated transfer time is further based on the size of the data payload.

15. The first computing device of claim 14, wherein the transfer time corresponding to each particular communication protocol is based on:

$$T_P = \frac{\text{Size}}{R_P} + S_P$$

where $T_P$ is the transfer time corresponding to the particular communication protocol P, Size is the size of the data payload, $R_P$ is the data transfer rate corresponding to the particular communication protocol P, and $S_P$ is the setup time corresponding to the particular communication protocol P.

16. The first computing device of claim 15, wherein the setup time corresponding to each particular communication protocol is based on:

$$S_P = L_P + \max|PS_{P(1)}, PS_{P(2)}|$$

where $L_P$ is the pairing time corresponding to the particular communication protocol P, $PS_{P(1)}$ is the power ON time for the communication module of the first computing device corresponding to communication protocol P, and $PS_{P(2)}$ is the power ON time for the communication module of the second computing device corresponding to communication protocol P.

17. The method of claim 9, wherein the first and second computing devices are not configured for communication with each other via any of the plurality of communication protocols prior to the establishing of the NFC.

18. The first computing device of claim 10, wherein the operations further comprise establishing NFC with the second computing device, wherein the information is provided to the first computing device by the second computing device during the establishing.

19. The first computing device of claim 18, wherein the first and second computing devices are not configured for communication with each other via any of the plurality of communication protocols prior to the establishing of the NFC.

* * * * *